(12) United States Patent
Santos-Lang et al.

(10) Patent No.: US 8,880,406 B2
(45) Date of Patent: Nov. 4, 2014

(54) AUTOMATIC DETERMINATION OF AND RESPONSE TO A TOPIC OF A CONVERSATION

(75) Inventors: Chris Santos-Lang, Belleville, WI (US); Sumit Rana, Verona, WI (US); Binit Mohanty, Madison, WI (US); Rajeev Gangwar, Madison, WI (US)

(73) Assignee: Epic Systems Corporation, Verona, WI (US)

( * ) Notice: Subject to any disclaimer, the term of this patent is extended or adjusted under 35 U.S.C. 154(b) by 809 days.

(21) Appl. No.: 13/073,579

(22) Filed: Mar. 28, 2011

(65) Prior Publication Data
US 2012/0253801 A1 Oct. 4, 2012

(51) Int. Cl.
| | | |
|---|---|---|
| G10L 25/00 | (2013.01) | |
| G10L 15/22 | (2006.01) | |
| G06F 17/28 | (2006.01) | |
| G06F 17/21 | (2006.01) | |
| G06F 17/20 | (2006.01) | |
| G06F 17/30 | (2006.01) | |
| G06F 3/16 | (2006.01) | |
| G06F 9/44 | (2006.01) | |
| G06F 17/00 | (2006.01) | |
| G09B 5/00 | (2006.01) | |
| G10L 15/00 | (2013.01) | |

(52) U.S. Cl.
CPC ...................................... G10L 15/22 (2013.01)
USPC ...... 704/275; 704/2; 704/8; 704/10; 704/235; 707/821; 707/736; 715/727; 706/52; 706/46; 434/169

(58) Field of Classification Search
USPC ................ 707/1, 821, 736; 704/235, 2, 10, 8; 715/727; 706/52, 46; 434/169
See application file for complete search history.

(56) References Cited

U.S. PATENT DOCUMENTS

| | | | | |
|---|---|---|---|---|
| 6,023,670 | A | * | 2/2000 | Martino et al. .................... 704/8 |
| 6,120,297 | A | * | 9/2000 | Morse et al. ................... 434/169 |
| 7,130,861 | B2 | * | 10/2006 | Bookman et al. .................... 1/1 |
| 7,725,467 | B2 | * | 5/2010 | Yamamoto et al. ........... 707/736 |

(Continued)

OTHER PUBLICATIONS

Dragon Medical Enterprise Metro Health: Successful Epic Deployment Relies on Dragon Medical Enterprise, Nuance Communications, Inc., 2010, pp. 1-4.

(Continued)

*Primary Examiner* — Paras D Shah
*Assistant Examiner* — Neeraj Sharma
(74) *Attorney, Agent, or Firm* — Bell & Manning, LLC

(57) ABSTRACT

A system, computer-readable medium, and method for automatically determining a topic of a conversation and responding to the topic determination are provided. In the method, an active topic is defined as a first topic in response to execution of an application. The first topic includes first text defining a plurality of phrases, a probability of occurrence associated with each of the plurality of phrases, and a response associated with each of the plurality of phrases. Speech text recognized from a recorded audio signal is received. Recognition of the speech text is based at least partially on the probability of occurrence associated with each of the plurality of phrases of the first topic. A phrase of the plurality of phrases associated with the received speech text is identified. The response associated with the identified phrase is performed by the computing device. The response includes instructions defining an action triggered by occurrence of the received speech text, wherein the action includes defining the active topic as a second topic.

21 Claims, 10 Drawing Sheets

(56) References Cited

U.S. PATENT DOCUMENTS

| | | | |
|---|---|---|---|
| 7,853,544 B2 * | 12/2010 | Scott et al. | 706/46 |
| 8,122,069 B2 * | 2/2012 | Soules et al. | 707/821 |
| 8,239,185 B2 * | 8/2012 | Johnson | 704/2 |
| 8,612,203 B2 * | 12/2013 | Foster et al. | 704/2 |
| 2003/0191625 A1 * | 10/2003 | Gorin et al. | 704/1 |
| 2006/0075347 A1 * | 4/2006 | Rehm | 715/727 |
| 2007/0011133 A1 * | 1/2007 | Chang | 707/1 |
| 2007/0106508 A1 * | 5/2007 | Kahn et al. | 704/235 |
| 2008/0154604 A1 | 6/2008 | Sathish et al. | |
| 2008/0195388 A1 | 8/2008 | Bower et al. | |
| 2009/0018842 A1 | 1/2009 | Caire et al. | |
| 2009/0094233 A1 * | 4/2009 | Marvit et al. | 707/5 |
| 2009/0326937 A1 | 12/2009 | Chitsaz et al. | |
| 2010/0145710 A1 | 6/2010 | Tremblay | |
| 2010/0179805 A1 | 7/2010 | Huerta et al. | |
| 2010/0204978 A1 | 8/2010 | Gao et al. | |
| 2010/0211390 A1 | 8/2010 | Hillebrecht et al. | |
| 2010/0293446 A1 | 11/2010 | Lucas et al. | |
| 2010/0324889 A1 | 12/2010 | Ativanichayaphong et al. | |
| 2011/0144978 A1 * | 6/2011 | Tinkler | 704/10 |
| 2012/0041751 A1 * | 2/2012 | Elfeky et al. | 704/2 |
| 2012/0233110 A1 * | 9/2012 | Balinsky et al. | 706/52 |

OTHER PUBLICATIONS

Speech Recognition: Accelerating the Adoption of Electronic Health Records, Nuance Communications, Inc., 2009, pp. 1-8.

The Electronic Patient Narrative a Clinical Imperative in the EMR Era, Nuance Communications, Inc., 2008, pp. 1-7.

Optimizing Clinical Productivity: Using Speech Recognition with Medical Features vs. a General Purpose Solution, Nuance Communications, Inc., 2009, pp. 1-7.

Guidelines for Speech-Accessible HTML for Dragon® NaturallySpeaking and Dragon® Medical, Nuance Communications, Inc., 2009, pp. 1-9.

http://www.nuance.com/company/news-room/press-releases/ND_003591, downloaded from the internet Jan. 5, 2011.

* cited by examiner

Fig. 7

| Speaker | Phrase | Probability | Response Table |
|---|---|---|---|
| Employee#0043 | "blood pressure" | 0.04732 | A |
| Employee#0043 | "cigarettes" | 0.03849 | B |
| Patient | "yes" | 0.01092 | C |

Fig. 8

| Weight | Modifiers | Response |
|---|---|---|
| 0.382 | If "diabetes" add 0.00038<br>If "pediatric" subtract 0.12 | Switch to topic model5; input speech into EMR input #9271 |
| 0.092 | | Switch to topic model 4; input speech into EMR input #17828 |
| 0.003 | | Backtrack |
| 0.001 | | Do nothing |

Fig. 9

AUTOMATIC DETERMINATION OF AND RESPONSE TO A TOPIC OF A CONVERSATION

BACKGROUND

Modern medical facilities generate huge amounts of patient related data (hereinafter "patient data") and the amount of data generated by such facilities is likely to increase exponentially in the foreseeable future given new procedures, medical equipment (e.g., imaging, test, and therapy systems) diagnostic protocols, increasing specialization, and an increased ability to store large amounts of data. As in other industries, the medical industry has embraced electronic records, referred to in the industry as electronic medical records (EMRs), to store the onslaught of patient data for subsequent access.

Various software tools can be used to facilitate the speed and ease of data entry into an electronic medical record (EMR) application. For example, the Dragon Medical software application developed by Nuance Communications, Inc. implements speech recognition (SR) to transcribe spoken utterances into free-text fields in an EMR application. The Dragon Medical software application can also be programmed with voice commands for special keyboard inputs, such as the tab key, to allow the clinician to navigate between EMR fields using the voice commands.

The Clinical Language Understanding software application also developed by Nuance Communications, Inc., implements natural language processing (NLP) and a medical ontology (MO) to recognize where the content of a free-text field indicates a value for inclusion in a discrete EMR field and to generate a tag so that the value can be automatically entered and stored in the discrete field. The automatic input to discrete EMR fields saves time and reduces the expense required to ensure that clinicians properly enter data into discrete fields, for example, to facilitate reporting. Additionally, some clinicians find it more natural to use free text to create notes and to allow the computer to extract the appropriate discrete data. As used herein, the term "clinician" refers to any employee or agent of a medical facility including but not limited to doctors, nurses, clinicians, technicians, other clinicians, etc.

SR is typically implemented using acoustic models (AM), which provide probabilities that various utterances are signified by various sounds, and language models (LM), which provide probabilities that various utterances will occur based on the relationships between words. For example, to recognize a given sound as a given clinician uttering "hat", having already decided that the clinician previously uttered, "the cat in the . . . ", the SR multiplies the probabilities for various utterances as provided by the two models, and selects "hat" if it has the highest combined probability for occurring next. Because humans are more likely to follow rules of grammar as defined in an LM when dictating than when carrying on a conversation, a language model is more helpful when transcribing dictation than when transcribing a conversation.

Much of the data to be entered into an EMR application is also shared in conversation with a patient or a colleague. For example, information entered for an outpatient visit is typically gathered through an interview and examination of a patient, where most of the results of the examination are discussed verbally with the patient. Repeating the same information a second time using a software application such as Dragon Medical is redundant in the sense that the clinician is communicating the same information twice albeit to different audiences. As another example, much of the information certain clinicians enter into an EMR at a hospital is also discussed with other clinicians during rounds. Eliminating these redundancies could save significant time for clinicians.

The current practice of communicating the same information twice creates a dilemma for clinicians: either the clinician enters each piece of data into the EMR, or makes a note reminding themselves to do so immediately before or after communicating it to the patient or the clinician waits until the human-to-human conversation is finished before focusing on the data entry into the EMR. In the first case, the clinician is less attentive to the patient or other clinician. In the second case, there is an increased risk that the two communications may not contain the same information because it is sometimes difficult to remember all of the details of the conversation afterwards. Much like using a keyboard or a mouse, communication using a software application such as Dragon Medical requires the clinician's attention, in a manner such that the EMR continues to exhibit a "self-centered" personality.

In some cases, clinicians have employed a third person (often called a "medical scribe") to passively listen to a conversation, for example, between the clinician and the patient. Listening to the conversation between the clinician and the patient, the third person recognizes at least some of the information discussed as applicable to an EMR field and enters the information into the EMR field immediately, at least as a rough draft. Over time, the third person may notice similarities between large sections of the many conversations a clinician has with patients and colleagues over the course of a day because, though the conversations differ in detail, a great deal of the flow of the conversation is predictable based on the clinician practice area or common ailments of patients. As the third person learns to recognize the predictable patterns of the conversations, it becomes easier for them to discern what is being said despite foreign accents and to respond appropriately using the EMR application. As a specific example, the third person may recognize patterns in the occurrence of various topics which arise during the conversation such as "measure blood-pressure", "determine patient concerns", "justify diagnosis", etc.

Additionally, an EMR system may include media that would enhance a conversation between a clinician and a patient or other clinicians, but the clinician is not likely to utilize such media because the EMR system generally requires that the clinician search for the related media. For example, the media may include a map to facilitate a conversation concerning an appointment at another facility or the pickup of a medication; a picture and a biography of a member of a care team to facilitate a discussion about them; a picture of a medication and/or of equipment to be purchased; a graph of a patient's history and/or prognosis; a video of a prescribed exercise; a picture of good and/or bad outcomes; a picture of body parts being discussed, etc. Such media is typically related to a "topic" of the conversation.

SUMMARY

In an example embodiment, a method for automatically determining a topic of a conversation and responding to the topic determination is provided. An active topic is defined as a first topic in response to execution of an application. The first topic includes first text defining a plurality of phrases, a probability of occurrence associated with each of the plurality of phrases, and a response associated with each of the plurality of phrases. Speech text recognized from a recorded audio signal is received. Recognition of the speech text is based at least partially on the probability of occurrence associated with each of the plurality of phrases of the first topic. A phrase of the plurality of phrases associated with the received speech text is identified. The response associated with the identified phrase is performed by the computing device. The response includes instructions defining an action triggered by occurrence of the received speech text, wherein the action includes defining the active topic as a second topic. The second topic includes second text defining a second plurality of phrases, a second probability of occurrence associated with each of the second plurality of phrases, and a second response associated with each of the second plurality of phrases.

In another example embodiment, a non-transitory computer-readable medium is provided having stored thereon computer-readable instructions that when executed by a computing device, cause the computing device to perform the method of automatically determining a topic of a conversation and responding to the topic determination.

In yet another example embodiment, a system is provided. The system includes, but is not limited to, a processor and the computer-readable medium operably coupled to the processor. The computer-readable medium has instructions stored thereon that when executed by the processor, cause the system to perform the method of automatically determining a topic of a conversation and responding to the topic determination.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 7 depicts a user interface window of the EMR application of FIG. 6 in accordance with an example embodiment.

FIG. 8 depicts a structure of a topic table in accordance with an example embodiment.

FIG. 9 depicts a structure of a response table in accordance with an example embodiment.

DETAILED DESCRIPTION

Hereinafter, the embodiments are described in relation to a medical facility and medical data. Nevertheless, it should be appreciated that the described embodiments can be applied in non-medical industries. For example, any application into which data can be electronically entered at least partially based on a conversation can utilize the described embodiments.

Figure 1:
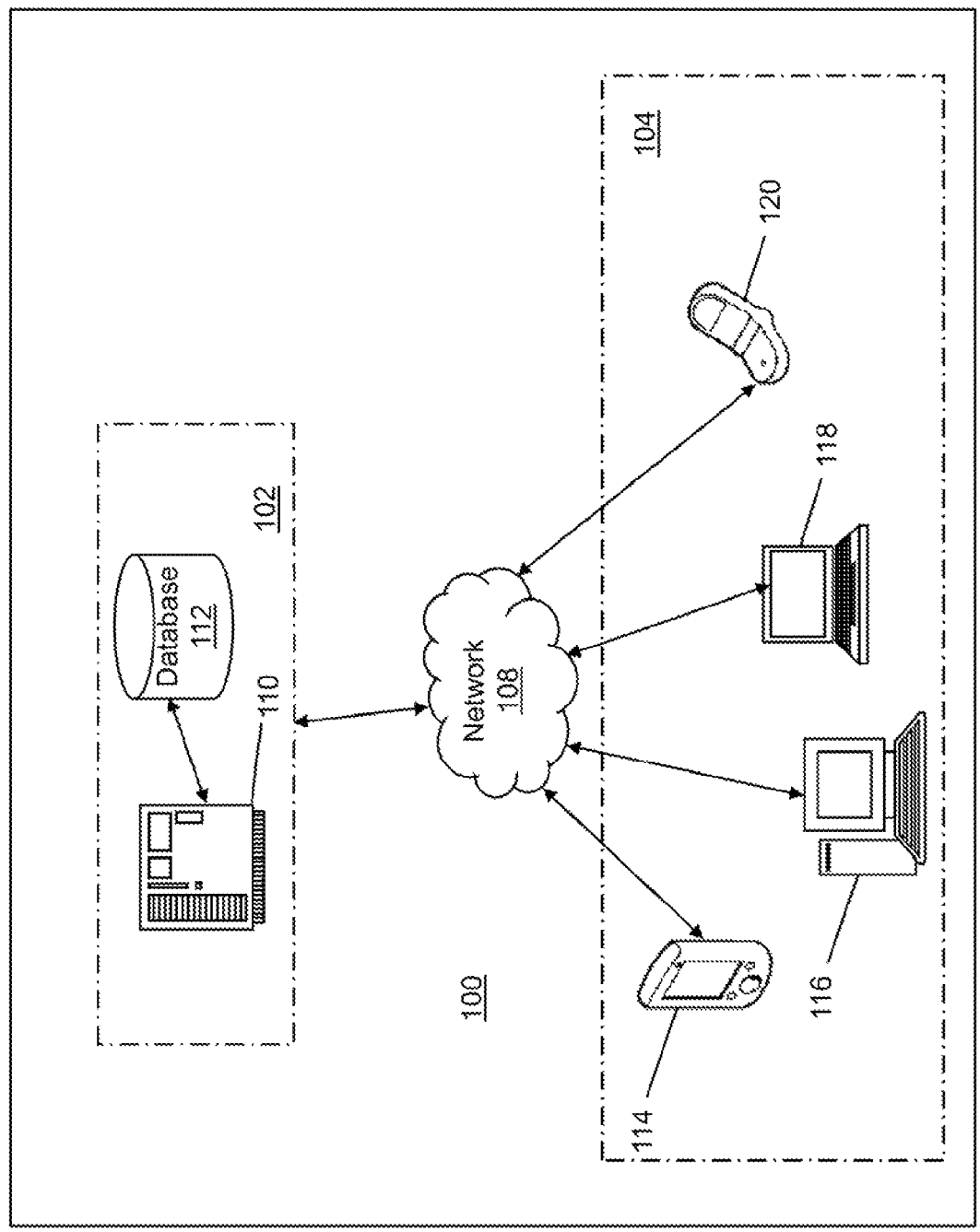
FIG. 1 depicts a block diagram of an EMR system in accordance with an example embodiment.

With reference to FIG. 1, a block diagram of an EMR system 100 is shown in accordance with an illustrative embodiment. In an illustrative embodiment, EMR system 100 may include a data processing system 102, a plurality of clinician systems 104, and a network 108. Network 108 may include one or more networks of the same or different types. Network 108 can be any type of wired and/or wireless public or private network including a cellular network, a local area network, a wide area network such as the Internet, etc. Network 108 further may be comprised of sub-networks and consist of any number of devices.

Data processing system 102 may include a server computing device 110 and a database 112. Server computing device 110 may be a computer of any form factor. Data processing system 102 further may include a plurality of server computing devices that may be connected directly or through network 108. Server computing device 110 includes or can access database 112 either through a direct connection or through network 108.

Database 112 is a data repository for EMR system 100. Database 112 may include a plurality of databases that may be organized into multiple database tiers to improve data management and access. Database 112 may utilize various database technologies and a variety of different formats as known to those skilled in the art including a file system, a relational database, a system of tables, a structured query language database, etc. Database 112 may be implemented as a single database or as multiple databases stored in different storage locations distributed over the Internet or other heterogeneous storage infrastructures.

The plurality of clinician systems 104 may include one or more computing devices. The one or more computing devices send and receive signals through network 108 to/from another of the one or more computing devices and/or to/from data processing system 102. The plurality of clinician systems 104 can include any number and type of computing devices that may be organized into subnets. The one or more computing devices may include computers of any form factor such as a personal digital assistant 114, a desktop 116, a laptop 118, an integrated messaging device, a cellular telephone 120, a smart phone, a pager, etc. The plurality of clinician systems 104 may include additional types of devices.

The one or more computing devices communicate using various transmission media that may be wired or wireless as known to those skilled in the art. The one or more computing devices may communicate information as peers in a peer-to-peer network using network 108. Clinicians may use a computing device of the one or more computing devices to receive information related to patients, to check a status of a patient, to update a status of the patient, to review test results from a data generation system, etc.

The data generation system generates data related to a patient in two-dimensions, three-dimensions, four-dimensions, etc. The source of and the dimensionality of the data is not intended to be limiting. In an example embodiment, the data is obtained from a device associated with measuring a physiological characteristic of a patient such as a temperature, a blood pressure, a heart rate, blood chemistry, a respiratory rate, a heart state or condition, an intra-abdominal pressure, etc. directly or as part of a laboratory test, from clinician evaluating and treating the patient, etc. Some or all of the various systems that makeup the data generation system may be connected to network 108 for the transmission of data, for example, for storage in database 112. Additionally, some or all of the various systems that makeup the data generation system may not be connected to network 108 for the transmission of the data. Instead, when a system is not connected to network 108, the data may be manually provided to data processing system 102. For example, the data may be scanned or otherwise stored on electronic media such as a compact disc (CD), digital video disc (DVD), a smart card, a flash memory device, etc.

The components of EMR system 100 may be positioned in a single location, a single facility, and/or may be remote from one another. EMR system 100 may be integrated in one or more computing devices. For example, the components of EMR system 100 may be integrated into a single computing device. One or more of the components of EMR system 100 may be connected directly, for example, using a cable for transmitting information between systems. One or more of the components of EMR system 100 may be connected using network 108 without limitation.

Figure 2:
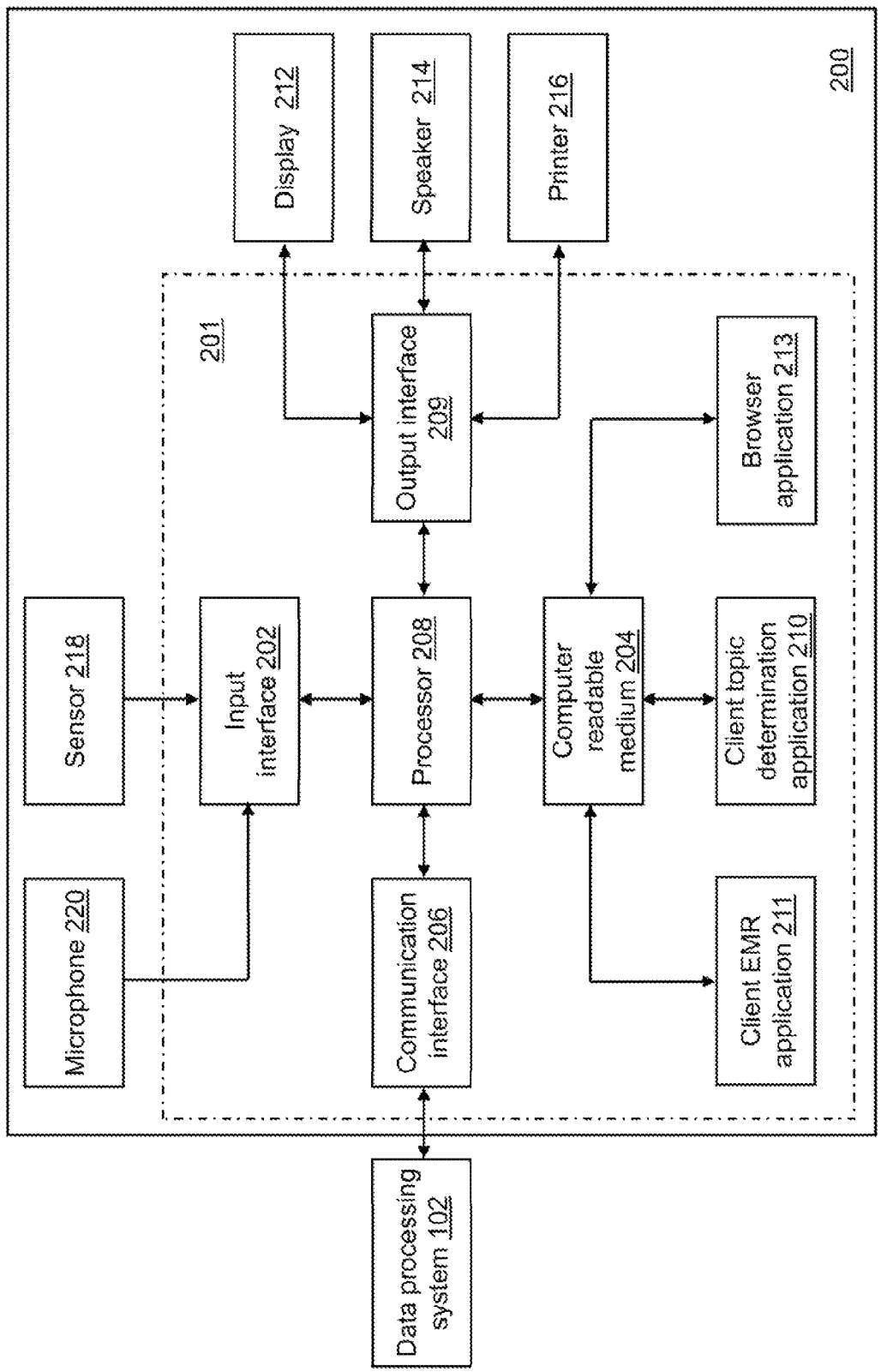
FIG. 2 depicts a block diagram of a clinician computing system of the EMR system of FIG. 1 in accordance with an example embodiment.

With reference to FIG. 2, a block diagram of a clinician device 201 of a clinician system 200 is shown in accordance with an example embodiment. Clinician system 200 is an example computing system of the plurality of clinician systems 104. Clinician system 200 may include clinician device 201, a display 212, a speaker 214, a printer 216, a sensor 218, and a microphone 220. Clinician device 201 may include an input interface 202, a computer-readable medium 204, a communication interface 206, a processor 208, an output interface 209, a client topic determination application 210, a client EMR application 211, and browser application 213. Different and additional components may be incorporated into clinician system 200 and/or clinician device 201.

Input interface 202 provides an interface for receiving information from the clinician for entry into clinician device 201 as known to those skilled in the art. Input interface 202 may use various input technologies including, but not limited to, a keyboard, a pen and touch screen, a mouse, a track ball, a touch screen, a keypad, one or more buttons, etc. to allow the clinician to enter information into clinician device 201 or to make selections presented in a user interface displayed on display 212. The same interface may support both input interface 202 and output interface 200. For example, a touch screen both allows clinician input and presents output to the clinician. Clinician device 201 may have one or more input interfaces that use the same or a different input interface technology.

Input interface 202 further provides an interface for receiving information from sensor 218. Sensor 218 may be any type of sensor including a global positioning system, a scale for measuring height and/or weight, etc. without limitation. Sensor 218 converts a measured parameter into an electrical signal that is input to clinician device 201 through input interface 202.

Input interface 202 still further provides an interface for receiving information from microphone 220. Microphone 220 may include an acoustic-to-electric transducer or sensor that converts sound into an electrical signal that is input to clinician device 201 through input interface 202. However, microphone 220 may be replaced by any device or system that converts conversations, including those in sign-language, to electric signals.

Computer-readable medium 204 is an electronic holding place or storage for information so that the information can be accessed by processor 208 as known to those skilled in the art. Computer-readable medium 204 can include, but is not limited to, any type of random access memory (RAM), any type of read only memory (ROM), any type of flash memory, etc. such as magnetic storage devices (e.g., hard disk, floppy disk, magnetic strips, . . . ), optical discs (e.g., CD, DVD, . . . ), smart cards, flash memory devices, etc. Clinician device 201 may have one or more computer-readable media that use the same or a different memory media technology. Clinician device 201 also may have one or more drives that support the loading of a memory media such as a CD or DVD. Computer-readable medium 204 may provide the electronic storage medium for database 112.

Communication interface 206 provides an interface for receiving and transmitting data between devices using various protocols, transmission technologies, and media as known to those skilled in the art. Communication interface 206 may support communication using various transmission media that may be wired or wireless. Clinician device 201 may have one or more communication interfaces that use the same or a different communication interface technology. Data and messages may be transferred between clinician system 200 and data processing system 102 using communication interface 206.

Processor 208 executes instructions as known to those skilled in the art. The instructions may be carried out by a special purpose computer, logic circuits, or hardware circuits. Thus, processor 208 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 208 executes an instruction, meaning that it performs/controls the operations called for by that instruction. Processor 208 operably couples with output interface 209, with input interface 202, with computer-readable medium 204, and with communication interface 206 to receive, to send, and to process information. Processor 208 may retrieve a set of instructions from a permanent memory device and copy the instructions in an executable form to a temporary memory device that is generally some form of RAM. Clinician device 201 may include a plurality of processors that use the same or a different processing technology.

Output interface 209 provides an interface for outputting information for review by a clinician of clinician device 201. For example, output interface 209 may include an interface to display 212, speaker 214, printer 216, etc. Display 212 may be a thin film transistor display, a light emitting diode display, a liquid crystal display, or any of a variety of different displays known to those skilled in the art. Speaker 214 may be any of a variety of speakers as known to those skilled in the art. Printer 216 may be any of a variety of printers as known to those skilled in the art. Clinician device 201 may have one or more output interfaces that use the same or a different interface technology. Display 212, speaker 214, and/or printer 216 further may be accessible to clinician device 201 through communication interface 206.

Client topic determination application 210 performs operations associated with listening to a conversation, for example, between a patient and clinician and/or between one or more clinicians to determine the topic of the conversation and determine a response to the topic, if appropriate. Some or all of the operations described herein may be embodied in client topic determination application 210. The operations may be implemented using hardware, firmware, software, or any combination of these methods. With reference to the example embodiment of FIG. 2, client topic determination application 210 is implemented in software (comprised of computer-readable and/or computer-executable instructions) stored in computer-readable medium 204 and accessible by processor 208 for execution of the instructions that embody the operations of client topic determination application 210. Client topic determination application 210 may be written using one or more programming languages, assembly languages, scripting languages, etc. Client topic determination application 210 may be implemented as a plug-in or be otherwise integrated with client EMR application 211 and/or browser application 213.

Client EMR application 211 performs operations associated with creating, maintaining, updating, etc. information related to a patient. Some or all of the operations described herein may be embodied in client EMR application 211. The operations may be implemented using hardware, firmware, software, or any combination of these methods. With reference to the example embodiment of FIG. 2, client EMR application 211 is implemented in software (comprised of computer-readable and/or computer-executable instructions) stored in computer-readable medium 204 and accessible by processor 208 for execution of the instructions that embody the operations of client EMR application 211. Client EMR application 211 may be written using one or more programming languages, assembly languages, scripting languages, etc.

Client EMR application 211 may be implemented as a Web application executing, for example, at clinician device 201 and/or server computing device 110 that supports any type of communication protocol. For example, client EMR application 211 may be configured to receive and to send hypertext transport protocol (HTTP) messages along with optional additional data content which may include web pages such as hypertext markup language (HTML) documents and linked objects from/to server computing device 110 and/or database 112.

Client EMR application 211 further may provide information or data organized in the form of a website accessible over network 108. A website may comprise multiple web pages that display a specific set of information and may contain hyperlinks to other web pages with related or additional information. Each web page is identified by a uniform resource locator (URL) that includes the location or address of the computing device that contains the resource to be accessed in addition to the location of the resource on that computing device. The type of file or resource depends on the Internet application protocol. For example, HTTP and HTTP secure (HTTPS) describe a web page to be accessed with a browser application. The file accessed may be a simple text file, an image file, an audio file, a video file, an executable, a common gateway interface application, a Java applet, or any other type of file supported by HTTP.

Browser application 213 performs operations associated with retrieving, presenting, and traversing information resources provided by a web application and/or web server as known to those skilled in the art. An information resource is identified by a uniform resource identifier (URI) and may be a web page, image, video, or other piece of content. Hyperlinks in resources enable clinicians to navigate to related resources. Example browser applications 213 include Navigator by Netscape Communications Corporation, Firefox® by Mozilla Corporation, Opera by Opera Software Corporation, Internet Explorer® by Microsoft Corporation, Safari by Apple Inc., Chrome by Google Inc., etc. as known to those skilled in the art.

Figure 3:
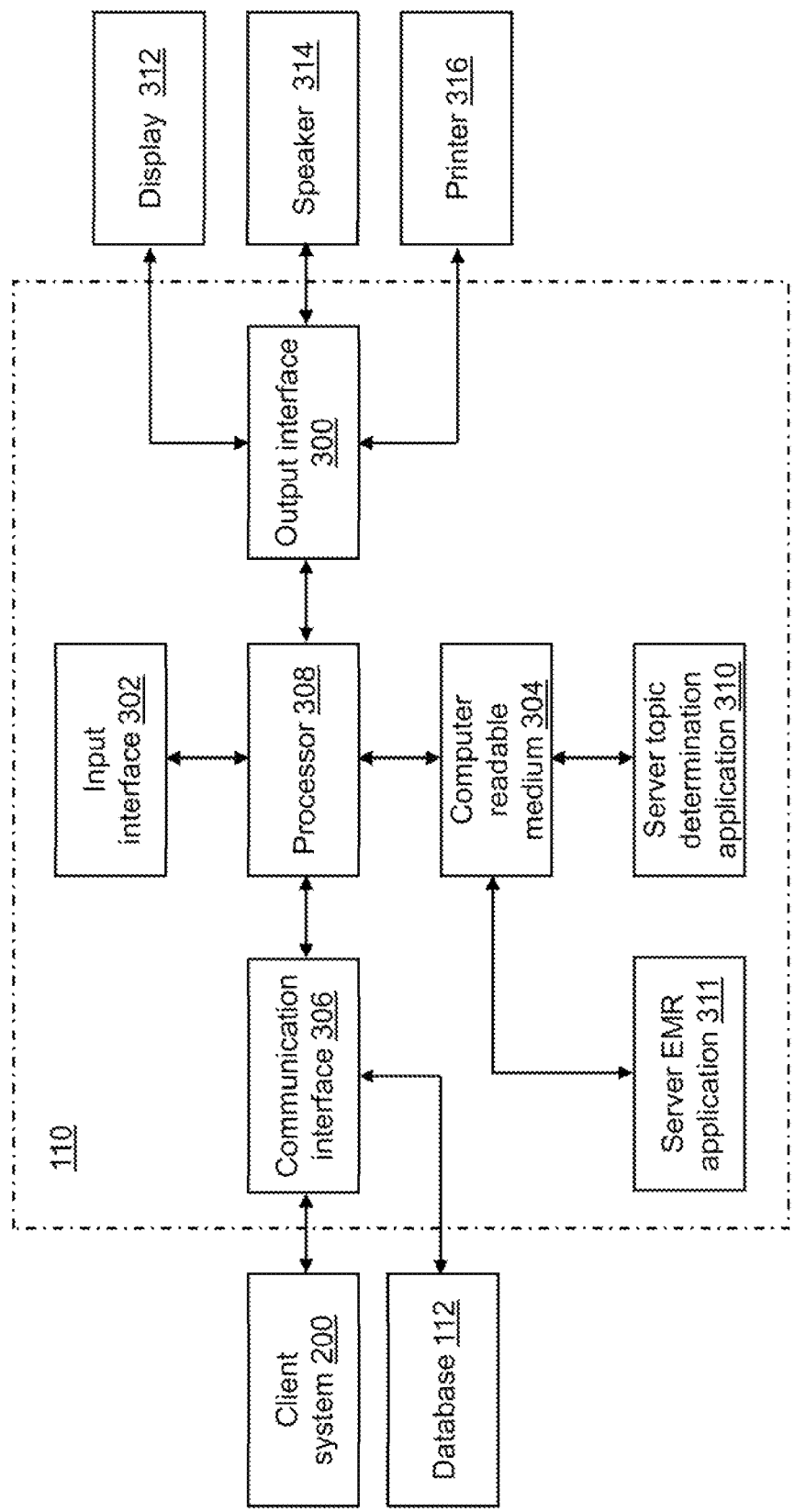
FIG. 3 depicts a block diagram of a data processing system of the EMR system of FIG. 1 in accordance with an example embodiment.

With reference to FIG. 3, a block diagram of server computing device 110 of EMR system 100 is shown in accordance with an example embodiment. Server computing device 110 may include a second output interface 300, a second input interface 302, a second computer-readable medium 304, a second communication interface 306, a second processor 308, a server topic determination application 310, a server EMR application 311, a second display 312, a second speaker 314, and a second printer 316. Different and additional components may be incorporated into server computing device 110.

Second output interface 300 provides the same or similar functionality as that described with reference to output interface 209 of clinician device 201. Second input interface 302 provides the same or similar functionality as that described with reference to input interface 202 of clinician device 201. Second computer-readable medium 304 provides the same or similar functionality as that described with reference to computer-readable medium 204 of clinician device 201. Second communication interface 306 provides the same or similar functionality as that described with reference to communication interface 206 of clinician device 201. Second processor 308 provides the same or similar functionality as that described with reference to processor 208 of clinician device 201. Server topic determination application 310 and client topic determination application 210 may be the same or different applications or part of an integrated, distributed application supporting some or all of the same types of functionality as described herein. Server EMR application 311 and client EMR application 211 may be the same or different applications or part of an integrated, distributed application supporting some or all of the same types of functionality as described herein. As an example, client EMR application 211 in combination with server EMR application 311 may reference functionality provided as part of an integrated health care software application such as those offered by Epic Systems Corporation and/or other software vendors. Second display 312 provides the same or similar functionality as that described with reference to display 212 of clinician device 201. Second speaker 314 provides the same or similar functionality as that described with reference to speaker 214 of clinician device 201. Second printer 316 provides the same or similar functionality as that described with reference to printer 216 of clinician device 201.

Figure 4:
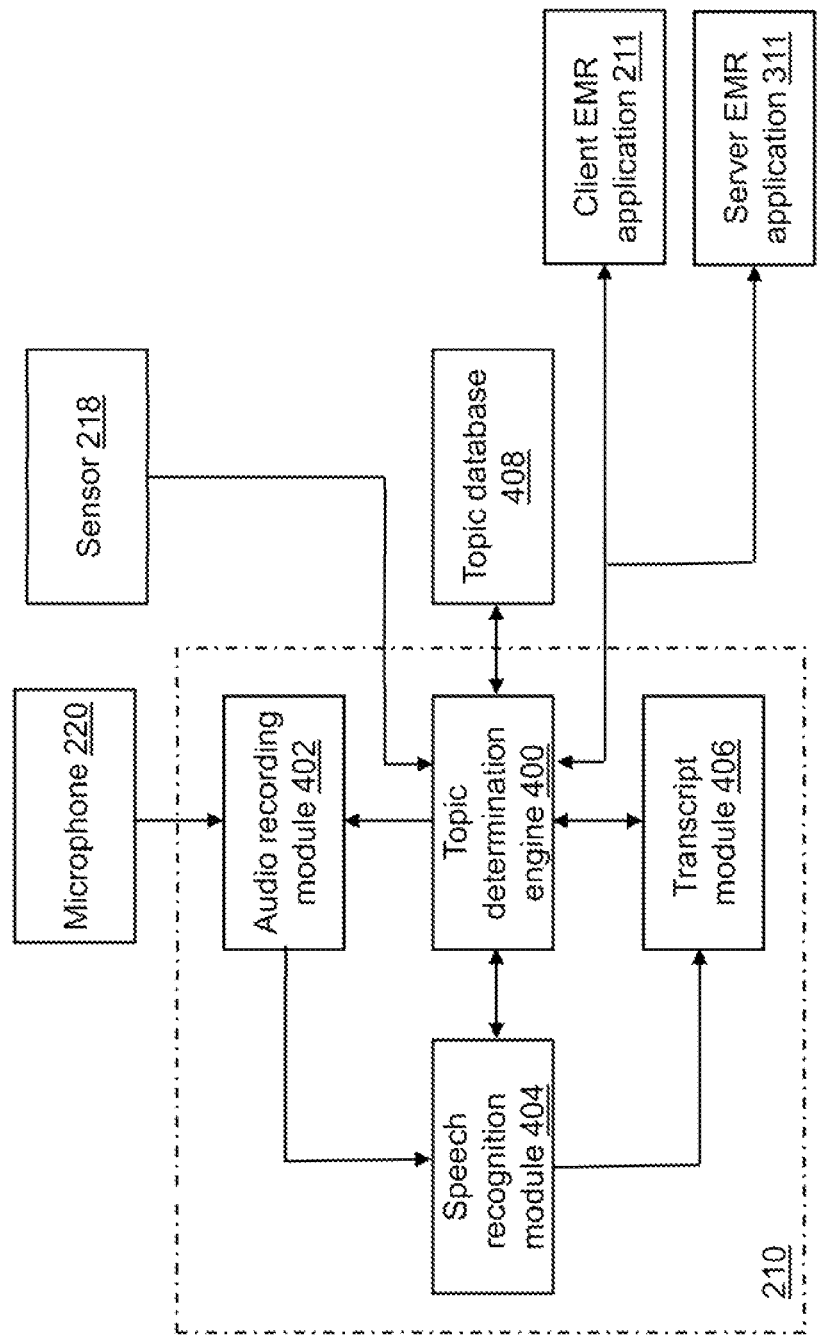
FIG. 4 depicts a block diagram showing interactions between components of the EMR system of FIG. 1 in accordance with a first example embodiment.

With reference to FIG. 4, a block diagram of client topic determination application 210 and its interactions with other components of EMR system 100 is shown in accordance with a first example embodiment. Client topic determination application 210 may include a topic determination engine 400, an audio recording module 402, a speech recognition module 404, and a transcript module 406. Topic determination engine 400 may communicate with a topic database 408. Topic database 408 may be included as part of database 112 and/or may be stored locally at clinician device 201. Different and additional modules may be incorporated into client topic determination application 210.

In the first example embodiment of FIG. 4, audio recording module 402 receives electrical signals representing sound captured by microphone 220. Topic determination engine 400 controls whether or not audio recording module 402 records the received electrical signals. Audio recording module 402 may be controlled in other ways in other embodiments. For example, audio recording module 402 may be controlled using a switch on the microphone. If the electrical signals are recorded, the electrical signals are input to speech recognition module 404, which performs speech recognition on the electrical signals. Topic determination engine 400 further may receive electrical signals from sensor 218 related to an environment of the conversation and/or a participant in the conversation. Transcript module 406 may transcribe the recognized speech. Based on the speech recognition and/or information from client EMR application 211 and/or server EMR application 311, topic determination engine 400 determines a topic of the speech and may trigger a response based on the determined topic using information stored in topic database 408 as discussed further below.

Figure 5:
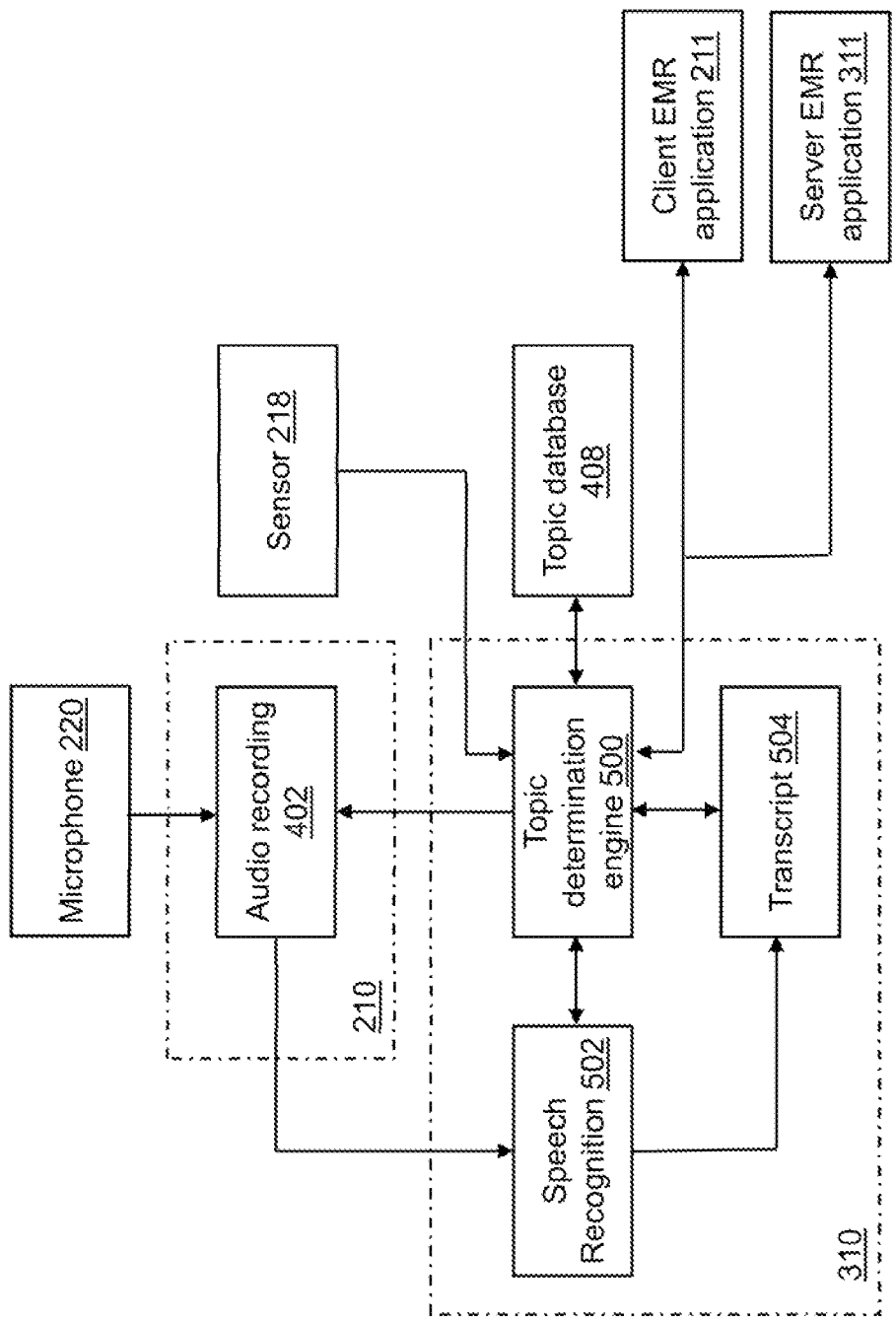
FIG. 5 depicts a block diagram showing interactions between components of the EMR system of FIG. 1 in accordance with a second example embodiment.

With reference to FIG. 5, a block diagram of client topic determination application 210 and its interactions with other components of EMR system 100 is shown in accordance with a second example embodiment. Client topic determination application 210 may include audio recording module 402. Server topic determination application 310 may include a topic determination engine 500, a speech recognition module 502, and a transcript module 504. Topic determination engine 400 may communicate with topic database 408 that may be included as part of database 112 and/or may be stored locally at server computing device 110. Different and additional modules may be incorporated into client topic determination application 210 and/or server topic determination application 310.

Additionally, the functionality of the modules may be distributed differently between client topic determination application 210 and server topic determination application 310 than that shown in either of FIGS. 4 and 5 based on response time requirements, data access restrictions, etc. Thus, as an example, EMR system 100 may use either speech recognition module 404 or speech recognition module 502 or some combination thereof as indicated by speech recognition module 404, 502 hereafter, or similarly indicated by transcript module 406, 504 and topic determination engine 400, 500.

Figure 6:
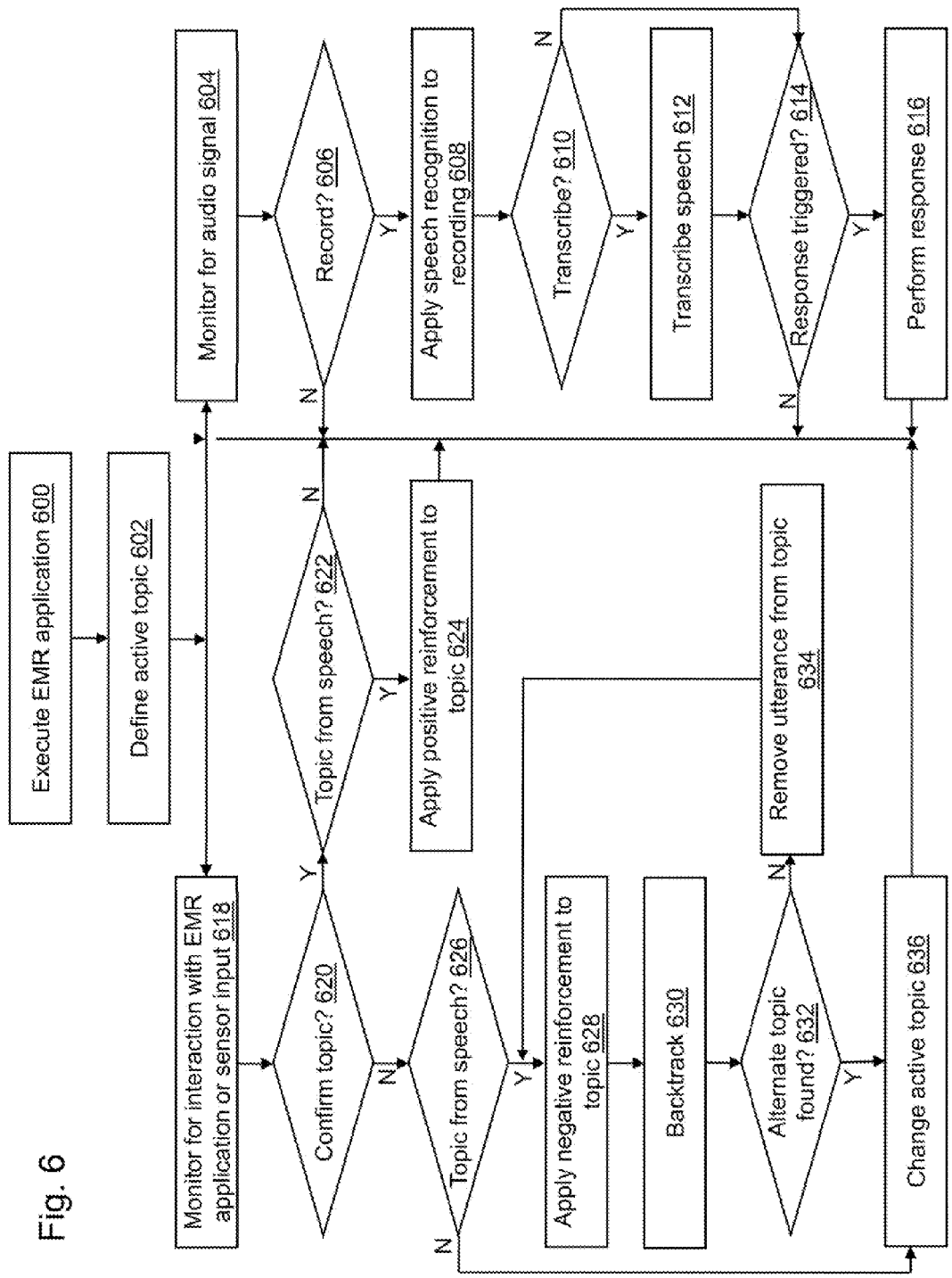
FIG. 6 depicts a flow diagram illustrating example operations performed through use of a topic determination application in combination with an EMR application of the clinician computing device of FIG. 2 in accordance with an example embodiment.

With reference to FIG. 6, example operations associated with client topic determination application 210 and/or server topic determination application 310, alone or in combination with client EMR application 211 and/or server EMR application 311, are described. The functionality described may be performed by client topic determination application 210 alone, by server topic determination application 310 alone, or through any integration of functionality desired between client topic determination application 210 and server topic determination application 310 and client EMR application 211 and/or server EMR application 311. Additional, fewer, or different operations may be performed depending on the embodiment. The order of presentation of the operations of FIG. 6 is not intended to be limiting. A clinician can interact with one or more user interface windows presented to the clinician in display 212 under control of client topic determination application 210 and/or client EMR application 211 independently or through use of browser application 213 in an order selectable by the clinician. Thus, although some of the operational flows are presented in sequence, the various operations may be performed in various repetitions, concurrently, and/or in other orders than those that are illustrated.

In an operation 600, a clinician may execute client EMR application 211 and/or server EMR application 311. For example, the clinician may "login" to use client EMR application 211 as known to a person of skill in the art. Execution of client EMR application 211 may cause presentation of a user interface window, which may include a plurality of menus and selectors such as drop down menus, buttons, text boxes, hyperlinks, etc. associated with client EMR application 211. As the clinician interacts with client EMR application 211, different user interface windows are presented to provide the clinician with more or less detailed information related to aspects of the patient's medical history. Thus, as known to a person of skill in the art, client EMR application 211 receives an indicator associated with an interaction by the clinician with a user interface window presented under control of client EMR application 211.

Figure 7:
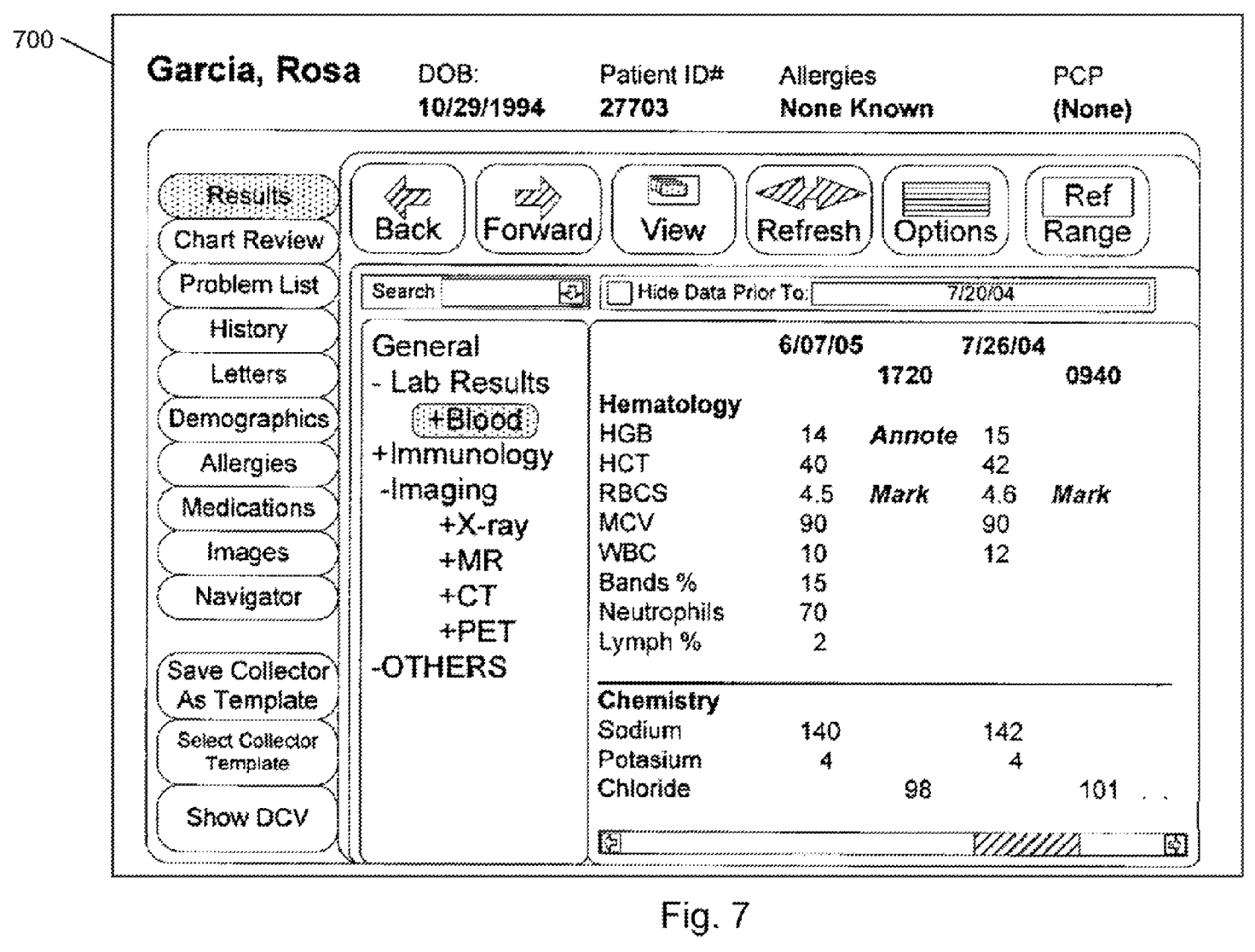

As an example, with reference to FIG. 7, a portion of a user interface window 700 is shown in accordance with an example embodiment after the clinician accesses/executes client EMR application 211 at clinician device 201. User interface window 700 further may be presented after the clinician accesses information related to a specific patient as known to a person of skill in the art. User interface window 700 includes patient information organized to allow access to medical information associated with a patient's medical chart and may be designed in various manners to provide a rapid and logical access to the patient's medical history by the clinician.

With continuing reference to FIG. 6, in an operation 602, an active topic is defined. A mapping between the topic and the state of client EMR application 211 can be assumed with an initial topic defined based on each initial state of client EMR application 211 and any input from sensor 218. There may be multiple conversations for each clinician login. For example, one patient may leave the room and another patient may enter. Thus, client EMR application 211 may have multiple initial states, one per conversation. The sensors may trigger the recognition that a new conversation has started.

Sensor 218 may transmit signals to topic determination engine 400, 500. For example, sensor 218 may detect that the clinician associated with Employee #0043 is meeting with a patient Rosa Garcia in exam room 4 at 10:00 am. Sensor 218 may include a clock to determine that the conversation is occurring during working hours and a global positioning system (GPS) to determine that the conversation is taking place in an exam room. Additionally, if different employees use different microphones, the clinician may be identified by which microphone is capturing the conversation. Sensor 218 may further include voice recognition, a camera, a radio frequency identifier, and various other types of sensors.

Topic determination engine 400, 500 receives the information from sensor 218 and uses this information to define an active topic, for example, by identifying the topic corresponding to a begin state from a plurality of topic models stored in topic database 408. Topic determination engine 400, 500 may send a message to client EMR application 211 and/or to server EMR application 311 to define the active topic.

The active topic is determined using the current state and a plurality of linked topic models that may be stored in database 408, for example, in the form of tables. With reference to FIG. 8, a topic model 800 is shown in accordance with an illustrative embodiment. Database 408 may include a table for each topic that can be determined. Topic model 800 is associated with a single, active topic and includes responses to be taken based on the output of speech recognition module 404, 502. For example, if the active topic is that associated with topic model 800, topic determination engine 400, 500 is listening for the outputs listed in topic model 800. In the illustrative embodiment, the outputs include a speaker identifier 802 and a phrase 804. Speaker identifier 802 identifies the speaker. The speaker may be identified using a variety of methods based on voice recognition, on knowledge of the location from which the voice originated and on where possible speakers are positioned, etc. and may be indicated using a variety of alphanumeric forms. For example, the speaker may be identified by name, clinician identification such as using an employee number, by a class of people fitting a role, such as a patient, etc. Topic model 800 need not include speaker identifier 802. Outputs may also include things other than phrases; for example, if speech recognition module 402, 502 performs natural language processing, the outputs may include semantic entities.

Phrase 804 includes one or more words spoken by the clinician or other conversation participant such as the patient or another clinician. As used herein, the term "utterance" indicates a combination of speaker identifier 802 and phrase 804.

Topic model 800 may also include an occurrence probability 806 associated with each utterance and a response 808. Occurrence probability 806 may be a conditional probability. Occurrence probability 806 is a number related to the probability that the combination of speaker identifier 802 and phrase 804 is expected to occur and be informative based on the current active topic and is used by speech recognition module 404, 502 to assist in a determination of the speech detected by microphone 220.

Response 808 includes instructions defining an action that is performed when the topic/utterance combination is detected. Multiple responses may be associated with the occurrence of each utterance. As a result, response 808 may include a response table identifier that identifies a response table to use to determine the appropriate response given occurrence of the recognized utterance.

With reference to FIG. 9, a response table 900 is shown in accordance with an illustrative embodiment. Database 408 may also include the response tables identified using each response 808. Response table 900 may include a weight 902, a modifier 904, and a response instruction 906 defined for each response possibility. Response instruction 906 includes instructions defining an action that is performed when the topic/utterance combination is recognized. Response instruction 906 may include a plurality of actions. For example, response instruction 906 may include an instruction to switch the active topic model and also to enter a portion of the associated phrase 804 or recognized speech into a text field of client EMR application 211. Thus, response table 900 includes a plurality of sets of response instructions each of which is associated with a specific weight.

Modifier 904 may include one or more modifier instructions 908 to account for other conditions. A modifier instruction of the one or more modifier instructions 908 may include a secondary characteristic 910 and a numerical adjustment value 912. For example, the condition that the patient has diabetes or is a child may change the value of weight 902, and therefore, the response taken. Thus, if the secondary characteristic, such as "diabetes" or "pediatrics", is true, weight 902 is adjusted by numerical adjustment value 912, which may be negative or positive. The response with the highest modified weight is performed. The responses may be implemented using a variety of techniques including, but not limited to, response instruction 906 providing the content for a script formatted in a scripting language or in an interpretable structure understood by processor 208, 308 and/or client topic determination application 210 and/or server topic determination application 310, response instruction 906 providing a pointer to an executable process stored in computer-readable medium 204, 304, response instruction 906 providing a pointer to a script stored in computer-readable medium 204, 304, etc.

A table of applicable facts may be provided by client EMR application 211 that may be supplemented by sensor 218. Topic determination engine 400, 500 may maintain a list of current facts and a list of obsolescence triggers linked to those facts. When client EMR application 211 sends a new fact to topic determination engine 400, 500, client EMR application 211 also sends a list of one or more triggers that are linked to the new fact, which are stored in the list of current facts and the list of obsolescence triggers. When client EMR application 211 sends a trigger, all facts linked to the trigger are removed. For example, a trigger might be "change of patient" at which point everything that topic determination engine 400, 500 has recorded about the patient becomes obsolete. As another example, a trigger might be "change medication order" at which point only those facts associated with the previous medication order become obsolete to topic determination engine 400, 500. Thus, if the previous order was associated with diabetes and an insulin medication, and the medication order is now associated with a heart condition, the facts associated with the diabetes condition are no longer considered relevant. As a result, by becoming obsolete, that information is no longer used as part of the decision making process.

With continuing reference to FIG. 6, topic determination engine 400, 500 waits for input from the clinician. The clinician may input directly to client EMR application 211 using mouse clicks, key presses, touch screen, etc. or may make utterances detected by microphone 220. Thus, in an operation 604, topic determination engine 400, 500 monitors for an audio signal received from microphone 220 as a result of a conversation between the clinician and a patient or other clinician, and in an operation 618 monitors for a clinician interaction with client EMR application 211 and/or receipt of a signal from sensor 218. Thus, sensor data from sensor 218 can confirm/disconfirm the topic in the same manner as information from client EMR application 211. For example, when a GPS indicates that the members of a conversation enter the room of Patient B, topic determination engine 400, 500 may determine that the members of the conversation are no longer talking about Patient A.

If a conversation is detected, a determination is made in an operation 606, concerning whether or not it is appropriate to record the conversation. If the determination is made that it is not appropriate to record the conversation, processing continues at operations 604 and 618 to continue monitoring for a conversation and interaction with client EMR application 211.

If the determination is made that it is appropriate to record the conversation, processing continues at an operation 608. In operation 608, the conversation is recorded using audio recording module 402 and the recorded audio is input to speech recognition module 404, 502. Speech recognition module 404, 502 performs speech recognition on the recorded audio. In speech recognition, an acoustic model (AM) is augmented by a language model (LM) that maps a set of words to likely subsequent words and their probability of occurring. For example, given the previous words "cat in the", a likely subsequent word might be "hat" and its probability of occurrence might be 0.00087. Multiplying the probabilities provided by the language and acoustic models, the probability that the speaker is saying "hat" given that the speaker is making a specific sound and previously said, "cat in the" is 0.00087×0.06092=0.000053, which is the probability determined by the LM multiplied by the probability determined by the AM.

Probability 806 may be used by speech recognition module 404, 502 in a variety of ways. For example, probability 806 may represent the probability of a phrase being spoken given the active topic which essentially encapsulates the information from the speaker, the state of client EMR application 211, the user input to client EMR application 211, etc. This probability can be defined as $P(W|C)$. A language model inherent to speech recognition module 404, 502 may contain a language model that provides the generic probability that a speaker of the English language (possibly in a medical environment) would say "blood pressure" given the words spoken before this phrase. This probability can be defined as P(W|L).

The two probabilities can be combined to enhance the performance of speech recognition module 404, 502. For a phrase with a low P(W|L) and a high P(W|C), a high P(W|L, C) is expected. Thus, while the language model does not favor a phrase, the topic does such that there is a higher probability for the occurrence of the phrase. For a phrase with a high P(W|L) and a low P(W|C), an average P(W|L, C) may be expected to emphasize a high probability English language word in any environment.

An example method for combining the two probabilities uses a linear combination of the above probabilities in the form: P(W|L, C)≈γP(W|C)+(1−γ)P(W|L), where γ is a factor determined heuristically and is less than 1. A higher γ results in more emphasis on the topic probability. Other formulations may be used to combine the two probabilities.

As another alternative, speech recognition module 404, 502 may combine the two probabilities as the converse of the product of the converses, P(W|L, C)≈1−(1−P(W|L))(1−P(W|C)). This method has the advantage that when the language model and the topic model disagree, the one with the higher probability has greater influence. As a result, failure to include an utterance in topic model 800 does not effect speech recognition. Additionally, if probability 806 is learned, probability 806 will converge to the kind of probability for which they are used.

In an alternative embodiment, a topic aware language model may be developed and used by speech recognition module 404, 502 such that probability 806 is included automatically by identifying the appropriate language model using the active topic. As another alternative, a separate language model may not be used for each topic. Instead, a single language model is used that is aware of the active topic and uses the active topic as factor in deciding its output.

In addition to probability 806, speech recognition module 404, 502 may also use other information included in the active topic model as context information. For example, speech recognition module 404, 502 may switch to an LM specialized for the given topic. As another option, the active topic model may be input to speech recognition module 404, 502, which adjusts its composite model based on this additional information. As language and acoustic models map sounds and previous words to likely new words, a "topic model" maps to new words from mental states attributed to the speaker such as "the provider is asking the patient to report any allergies not already recorded". Computer interface design assumes theories about such mental states and their relationships. As a result, a topic model can be generated by parsing a user interface much as a language model can be generated from a dictionary and rules of grammar such that the probability that a given utterance occurred is generated by multiplying a number from each of an LM, an AM, and a topic model.

The typical speech recognition model is constructed as:

$$P(W|A) = \frac{P(W, A)}{P(A)} = \frac{P(A|W)P(W)}{P(A)},$$

where A is the acoustic utterance and W is the actual word spoken. The W for which the probability is a maximum is determined as:

$$\max_W P(W|A) = \max_W \frac{P(A|W)P(W)}{P(A)} = \max_W P(A|W)P(W),$$

where P(A|W) is from the AM, and P(W) is from the LM. P(A|W) is typically modeled using hidden Markov models and P(W) using n-gram models with various kinds of smoothing though other methods may be used.

Similarly, a topic model can be defined as P(T|A, U, S), where T is the topic, A is the acoustic signal, U is the clinician input, and S is the sensor input. Ignoring the sensor input, assuming that the topic directly indicates the state of client EMR application 211, and applying Bayes rule results in:

$$P(T|A, U) = \frac{P(T, A, U)}{P(A, U)} = \frac{P(A, U|T)P(T)}{P(A, U)} = \frac{P(A|T, U)P(U|T)P(T)}{P(A, U)}$$

Assuming that A and U are independent of each other given T, results in P(A, U|T)=P(A|T)P(U|T), which is an approximation. The T for which the probability is a maximum is determined as:

$$\max_T P(T|A, U) = \max_T \frac{P(A|T)P(U|T)P(T)}{P(A, U)} = \max_T P(A|T)P(U|T)P(T),$$

where P(A|T) is from the acoustic model, P(U|T) is from the clinician-input model, and P(T) is the topic model.

There are many different models that can be used to estimate the probabilities. For example, frequency counting can be used to estimate the probabilities by recording utterances and interface interactions with client EMR application 211 and counting the various events. For example, if the clinician says blood pressure of 120/80 and also enters 120/80 in a text box associated with blood pressure presented in a user interface of client EMR application 211, the EMR state may indicate that the "vitals" section of client EMR application 211 is in focus, the blood pressure field is selected, and a value of 120/80 is entered. One instance of a topic of blood pressure, one instance of an utterance "Blood Pressure", and one instance of the mouse being clicked in the blood pressure text field may be recorded. The models may be adjusted based on input from experts to achieve good baseline accuracy.

The assumption that there is a one-to-one mapping between the topic and the state of client EMR application 211 can be relaxed by introducing a probabilistic link between the state and the topic as:

$$P(T|A, U, S) =$$
$$\frac{P(S, T, A, U)}{P(A, U, S)} = \frac{P(A, U, S|T)P(T)}{P(A, U, S)} = \frac{P(A|T)P(U|T)P(S|T)P(T)}{P(A, U, S)},$$

where S is the state. As a result, a single topic may cause multiple states.

In an operation 610, a determination is made concerning whether or not the recognized speech should be transcribed. If the determination is made that the recognized speech should be transcribed, processing continues at operation 612. If the determination is made that the recognized speech should not be transcribed, processing continues at operation 614. In operation 612, the recognized speech is input to and transcribed by transcript module 406, 504. The transcription may be stored in database 112 in association with other information such as identifiers identifying the conversation participants, the date, time, and location of the conversation, the active topic, etc.

In operation 614, a determination is made concerning whether or not a response is triggered by the occurrence of the recognized speech based on the active topic model. For example, the active topic model is traversed to determine if the recognized speech is included in the active topic model. If no response is triggered because the recognized speech is not included in the active topic model, processing continues at operations 604 and 618 to continue monitoring for a conversation and interaction with client EMR application 211. If the recognized speech is included in the active topic model, the response is performed in an operation 616 and processing continues at operations 604 and 618 to continue monitoring for a conversation and interaction with client EMR application 211. For example, if the speech recognized by speech recognition module 404, 502 is identified in the active topic model, the response table identifier 808 associated with the utterance is selected, and the associated response table is opened. Any modifiers that apply are considered before determining the appropriate response based on the highest weight. The instructions defined by the appropriate response are performed.

The instructions included in the response table are performed in operation 616. For example, a response may be to change the active topic so that a different topic model is used. Other responses may include triggering an action associated with the state of client EMR application 211 such as opening a new user interface window, entering all or a portion of the utterance in a field of client EMR application 211, directing future utterances to a field of EMR application 211, changing the focus of client EMR application 211, changing options available in a user interface window, etc. The new user interface window may also trigger execution of a second application. Of course, the second application may be integrated with or independent of client EMR application 211. For example, an image, map, video, etc. may be presented in the new user interface window or in a portion of the current user interface window, or an application to perform a calculation or prepare a form is executed and a result presented in the new user interface window or in a portion of the current user interface window. Thus, if the topic of the conversation is determined to relate to a magnetic resonance image (MRI) of the patient, the new user interface window may present the MRI to facilitate the conversation. As another example, if the topic of the conversation is determined to relate to an exercise recommended for the patient, the new user interface window may present a video showing the exercise being performed. If the topic of the conversation is determined to relate to new allergies developed by the patient, the new user interface window may list the patient's current allergies and add the new allergy to the allergy list. If the topic of the conversation is determined to relate to a blood test, the new user interface window may include one or more blood test results for the patient such as those shown in user interface window 700.

If the topic of the conversation is determined to relate to a diagnosis with a difficult to pronounce (and hear) name, the new user interface window may display the spelling of the name. If the topic of the conversation is determined to relate to patient instructions for treating a rash, the new user interface window may present what to expect a normal recovery to look like and what abnormal symptoms to look-out for. If the topic of the conversation is determined to relate to a plan of treatment, the new user interface window may open to a free-text field where the plan of treatment is to be documented so that the user can observe their dictation being entered there.

With continuing reference to FIG. 6, in operation 618, topic determination engine 400, 500 monitors for a clinician interaction with client EMR application 211. If a clinician interaction with client EMR application 211 is detected, a determination is made, in an operation 620, concerning whether or not the interaction confirms that the active topic is correct. For example, a click in the blood-pressure field of the user interface window of client EMR application 211 confirms that the active topic is blood-pressure. If the interaction confirms that the active topic is correct, a determination is made, in an operation 622, concerning whether or not the active topic was determined based on the recognized speech. If the active topic was determined based on the recognized speech, positive reinforcement is applied for the utterance that transitioned to the confirmed topic, in an operation 624, and processing continues at operations 604 and 618 to continue monitoring for a conversation and interaction with client EMR application 211.

Positive reinforcement for an utterance and topic transition can be accomplished through a variety of known machine learning algorithms. For example, weight 902, modifiers 904, and/or probability of occurrence 806 may be updated. As one illustrative embodiment, a positive constant, $C<1$, can be determined empirically or by expert judgment, and the new weight, W, for the response receiving reinforcement becomes $W+C(1-W)$. The complete set of weights may be normalized by dividing by the sum of the weights.

Similarly, each probability of occurrence 806 may be stored with a sample size, which becomes itself plus one. The new probability of occurrence 806 becomes one more than the product of the previous probability and sample size divided by the new sample size. For the probability of occurrence 806 of the utterances that did not occur, the sample size is increased by one and the new probability becomes the product of the previous probability and sample size divided by the new sample size.

To improve performance, an utterance may be dropped or no longer updated if the probability of occurrence 806 falls below a threshold. Updates to the sample size may be stopped if the sample size exceeds a maximum value. The threshold and the maximum sample size value can be determined empirically or using expert judgment.

If the active topic was not determined based on the recognized speech, processing continues at operations 604 and 618 to continue monitoring for a conversation and interaction with client EMR application 211. For example, since a mouse click in the blood pressure field of the user interface window of client EMR application 211 confirms that the active topic is A, the mouse click also confirms that an active topic of B would not be correct. If the interaction confirms that the active topic is not correct, a determination is made, in an operation 626, concerning whether or not the active topic was determined based on the recognized speech.

If the active topic was not determined based on the recognized speech, in an operation 636, the active topic is changed based on the interaction with client EMR application 211 and processing continues at operations 604 and 618 to continue monitoring for a conversation and interaction with client EMR application 211. Changing the active topic may include looking-up the new topic in topic database 408, recording the topic change in computer readable medium 204 with links to the relevant section of the audio recording and/or transcript, sending a message to client EMR application 211 and/or server EMR application 311 to set the active topic, and sending the topic model associated with the active topic to speech recognition module 404, 502, which adjusts the composite model (AM+LM+MM) as appropriate.

If the active topic was determined based on the recognized speech, negative reinforcement is applied for the transition from the last confirmed topic in an operation 628. Negative reinforcement for a transition can be applied using a variety of known machine learning algorithms. For example, weight 902 and/or modifiers 904 may be updated. For example, in an illustrative embodiment, there is a positive constant, D<1, which can be determined empirically or by expert judgment, and the new weight for the response receiving reinforcement becomes itself times D. After adjusting the weight, the complete set of weights may be normalized by dividing by the sum of the weights.

In an operation 630, a previous topic list is traversed in reverse (backtracked) in an attempt to identify an alternate topic based on the speech recognized since the active topic was changed. Topic determination engine 400, 500 reinterprets the recorded audio from the point of the last confirmation forward. Thus, topic determination engine 400, 500 returns to the last confirmed topic, locates the response table for that topic and the utterance that caused transition from it, swaps the highest weight with the next highest weight that has not been tried using that response table. If the set of alternate responses is exhausted, i.e., the response for the next highest weight is to backtrack, the utterance is removed for that topic. The backtracking may result in the removal of multiple utterances from multiple topics (one per topic). The removal process stops when an alternate interpretation of the topic history identifies an alternate topic.

Thus, in an operation 632, a determination is made concerning whether or not an alternate topic was found. If an alternate topic was found by backtracking, the active topic is changed to the alternate topic in operation 636 and processing continues at operations 604 and 618 to continue monitoring for a conversation and interaction with client EMR application 211. If an alternate topic was not found by backtracking, in an operation 634, the utterance is removed from the topic table and processing continues at operation 628 to continue backtracking to identify an alternate topic.

The process described in FIG. 6, may further include extracting new utterances that trigger a transition to a new active topic based on an interaction with client EMR application 211 that indicates a change in the active topic as in operation 636. For example, the words/phrases that appear in the transcript produced by speech recognition module 404, 502 between the times of confirmation of two successive topics may be added to the previously active topic with their speaker with a neutral probability. The associated response table may indicate "backtrack and recalculate the active topic" as a response with weight T, along with the response of the transition with probability 1−T. The need to extract new utterances generally becomes less needed as the process is used. As a result, the addition of new utterances may be stopped based on a random value exceeding a threshold where the threshold increases with time or based on a determination that highly probable utterances already exist that support the given topic transition.

New utterances may also be learned by training speech recognition module 404, 502 to conflate the new utterance into a pre-existing utterance. For example, if the clinician says "Dyspepsia" and selects something in client EMR application 211 that corresponds to the topic associated with the utterance "indigestion", the utterance "dyspepsia" can be added in all of the same places as "indigestion".

Figure 10:
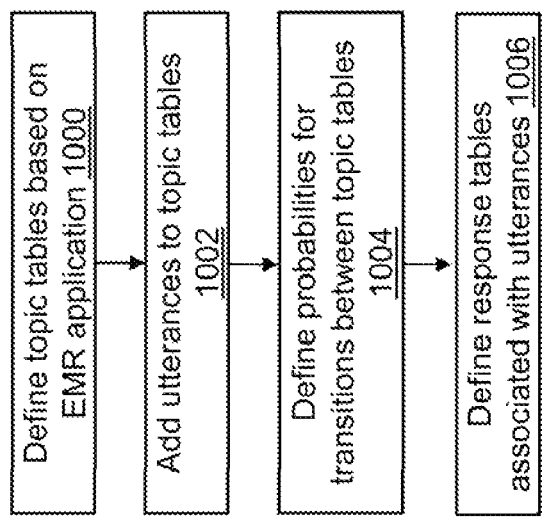
FIG. 10 depicts a flow diagram illustrating example operations performed in defining topic tables for use by the topic determination application in accordance with an example embodiment.

With reference to FIG. 10, example operations associated with defining an initial set of topic models for use by client topic determination application 210 and/or server topic determination application 310 are described. Additional, fewer, or different operations may be performed depending on the embodiment. The order of presentation of the operations of FIG. 10 is not intended to be limiting. Although the operational flows are presented in sequence, the various operations may be performed in various repetitions, concurrently, and/or in other orders than those that are illustrated.

In an operation 1000, an initial set of topic tables are defined based on the workflow defined for client EMR application 211 and/or server EMR application 311. For example, a database is created with one topic for each possible conversation begin-state, i.e., a time, a location, and a set of speakers. All of the elements that can receive focus/input in client EMR application 211 and/or server EMR application 311 are iterated through and corresponding topics defined. This includes, for example, every clickable element of a graphical user interface and every hot-key that can be entered. The process may be at least partially automated using screen-scraping technologies or mining the code/data used to generate the user interface for client EMR application 211 and/or server EMR application 311. For each element, a topic to be associated with that element is added to the topic model. The topic is added to an auxiliary database with a list of words/phrases to be associated with that topic, the identifier of the topic associated with the element that would be next to receive focus (e.g. the one that would receive focus if the clinician clicks the link or hits enter, tab, etc), and a list of identifiers of screens/screen sections on which the associated element appears, and, if activating the element makes other screens/sections available (e.g. clicking a hyperlink), a list of such screens/sections.

Words/phrases may be associated with a topic because they occur in the associated element's name, are synonyms, are in text (e.g. a button or hyperlink), a label, a choice-set, a tooltip, or help text, or in a key map (in the case of a hot-key), etc. Topics for fields that take special kinds of non-discrete input, such as numeric, date, time, may receive sets of words associated with that type such as number words (e.g. "one", "two", etc.). Additional words/phrases can be added using a thesaurus. The set of words/phrases may be filtered to remove terms like "the", which contributes little to identifying a topic.

In an operation 1002, utterances are added to the topic tables defined in operation 1000. For example, all utterances involving the words/phrases identified for any topic in operation 1000 are added to all topic tables with the probability for all utterances initialized to one or some other value less than one based on expert judgment.

In an operation 1004, probabilities for transitioning between topic tables based on the utterances are defined and added to the topic tables. A variety of techniques can contribute to the determination of the probabilities including definition/adjustment by experts and counting how often actual clinicians make the associated transitions when using client EMR application 211 and/or server EMR application 311 regularly. One contributor can be automated extraction from client EMR application 211 and/or server EMR application 311 by applying heuristics such as assigning a probability of X1 to every transition where the second topic in the transition is associated with an element that would receive focus when the element associated with the first topic is activated or loses focus (e.g. the link is clicked, the clinician hits tab or enter, etc.). If not assigned in the preceding step, a probability of X2 can be assigned to every transition between topics associated with the same screen/section. If not assigned in either of the preceding steps, a probability of X3 can be assigned to every transition that would be achieved in multiple steps, where the middle steps have already been assigned non-zero probabilities and involve topics associated with elements that open new user interface window or section of a user interface window.

In addition to the above heuristics, the structure of client EMR application 211 and/or server EMR application 311 may also be used to initialize transition probabilities. For example, organization (right-to-left and top-to-bottom) of the EMR elements may be used as a starting point for expected transition probabilities. Additional (or fewer) heuristics may be applied and the values X1 through X3 may be selected empirically or based on expert judgment.

In an operation 1006, the response tables associated with the utterances are defined. These can be automatically determined from the auxiliary data collected in previous operations. A threshold T may be defined empirically or by expert judgment. For each topic/utterance combination, a response "backtrack and recalculate the topic" is defined as a response with weight T. Additionally, if the utterance appears among those associated with a second topic with transition probability>T, that transition is added as a response with the probability as the weight. For initial active topics that may be defined, all other topics are included as probable transitions ignoring T.

Using a similar process, modifications to client EMR application 211 and/or server EMR application 311 can be propagated to suggest modifications to an already existing topic model. Thus, as new versions of client EMR application 211 and/or server EMR application 311 are created, a similar process can be used to automatically update the topic models and/or response tables.

Client topic determination application 210 and/or server topic determination application 310 use speech recognition module 404, 502 to allow client EMR application 211 and/or server EMR application 311 to respond to conversations between a clinician and one or more patients/clinicians by maintaining a list of potential utterances and/or semantic entities and responses to be performed by client EMR application 211 and/or server EMR application 311 when such outputs occur. Responses include entering data or changing the field to which data is directed. The entered data may be accompanied by additional data indicating that the data needs confirmation and/or specifying a recording of the conversation or the relevant part of the recorded conversation. Responses also may include navigating through client EMR application 211 and/or server EMR application 311 to display relevant entry user interface windows, relevant output user interface windows, or relevant media (image, video, map, etc.) as described above. Where clinicians use standard templates for standard visits, the topic model may encapsulate the entire recommended workflow. For example, during a six month well-child visit, client topic determination application 210 and/or server topic determination application 310 can use the topic cues such as the patient's age and other conversation cues to present the clinician with a standard template for such a visit.

The described processes need not be performed in real-time. For example, recorded conversations could be processed after the fact.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of example embodiments has been presented for purposes of illustration and of description. It is not intended to be exhaustive or to limit the invention to the precise form disclosed, and modifications and variations are possible in light of the above teachings or may be acquired from practice of the invention. The functionality described may be implemented in a single application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system comprising:
a processor; and
a computer-readable medium operably coupled to the processor, the computer-readable medium having computer-readable instructions stored thereon that, when executed by the processor, cause the system to in response to execution of an application by the system, define an active topic as a first topic, wherein the first topic includes first text defining a plurality of phrases, a probability of occurrence associated with each of the plurality of phrases, and a response associated with each of the plurality of phrases;
receive speech text recognized from a recorded audio signal, wherein recognition of the speech text is based at least partially on the probability of occurrence associated with each of the plurality of phrases of the first topic;
identify a phrase of the plurality of phrases associated with the received speech text;
perform the response associated with the identified phrase, wherein the response includes instructions defining an action triggered by occurrence of the received speech text, and further wherein the action includes defining the active topic as a second topic, wherein the second topic includes second text defining a second plurality of phrases, a second probability of occurrence associated with each of the second plurality of phrases, and a second response associated with each of the second plurality of phrases;
receive an indicator of an interaction with the application by a user;
in response to receipt of the indicator, determine if the active topic is a correct topic based on the interaction with the application;
if the active topic is determined to be the correct topic based on the interaction with the application, increase the probability of occurrence associated with the identified phrase; and
if the active topic is determined to not be the correct topic based on the interaction with the application, decrease the probability of occurrence associated with the identified phrase.

2. The system of claim 1, further comprising a microphone to generate the audio signal.

3. A non-transitory computer-readable medium having stored thereon computer-readable instructions that when executed by a computing device cause the computing device to:
- define an active topic as a first topic in response to execution of an application by the computing device, wherein the first topic includes first text defining a plurality of phrases, a probability of occurrence associated with each of the plurality of phrases based on the first topic, and a response associated with each of the plurality of phrases;
- receive speech text recognized from a recorded audio signal, wherein recognition of the speech text is based at least partially on the probability of occurrence associated with each of the plurality of phrases of the first topic;
- identify a phrase of the plurality of phrases associated with the received speech text;
- perform the response associated with the identified phrase, wherein the response includes instructions defining an action triggered by occurrence of the received speech text, and further wherein the action includes defining the active topic as a second topic, wherein the second topic includes second text defining a second plurality of phrases, a second probability of occurrence associated with each of the second plurality of phrases, and a second response associated with each of the second plurality of phrases;
- receive an indicator of an interaction with the application by a user;
- in response to receipt of the indicator, determine if the active topic is a correct topic based on the interaction with the application;
- if the active topic is determined to be the correct topic based on the interaction with the application, increase the probability of occurrence associated with the identified phrase; and
- if the active topic is determined to not be the correct topic based on the interaction with the application, decrease the probability of occurrence associated with the identified phrase.

4. The non-transitory computer-readable medium of claim 3, wherein the application includes input controls for accessing a plurality of user interface windows and for entering information in a database.

5. The non-transitory computer-readable medium of claim 4, wherein the application maintains electronic medical records in the database.

6. The non-transitory computer-readable medium of claim 4, wherein the action includes entering at least a portion of the speech text in a data entry field of a user interface window of the plurality of user interface windows.

7. The non-transitory computer-readable medium of claim 4, wherein the action includes presenting a user interface window of the plurality of user interface windows in a display operably coupled with the computing device.

8. The non-transitory computer-readable medium of claim 7, wherein the user interface window includes an image associated with the second topic.

9. The non-transitory computer-readable medium of claim 7, wherein the user interface window includes a video associated with the second topic.

10. The non-transitory computer-readable medium of claim 4, wherein the action includes changing a focus of a user interface window of the plurality of user interface windows presented in a display operably coupled with the computing device.

11. The non-transitory computer-readable medium of claim 3, wherein the action includes triggering execution of a second application by the computing device.

12. The non-transitory computer-readable medium of claim 3, wherein the first topic further includes a speaker associated with each of the plurality of phrases, wherein the probability of occurrence is further associated with the speaker.

13. The non-transitory computer-readable medium of claim 3, wherein the instructions include a plurality of actions triggered by occurrence of the received speech text.

14. The non-transitory computer-readable medium of claim 3, wherein the response includes an identifier of a response table, and further wherein the response table includes a plurality of sets of instructions.

15. The non-transitory computer-readable medium of claim 14, wherein the response table further includes a weight associated with each set of instructions of the plurality of sets of instructions.

16. The non-transitory computer-readable medium of claim 15, wherein the response table further includes a modifier associated with a set of instructions of the plurality of sets of instructions, and further wherein the modifier includes a secondary characteristic and a numerical adjustment value, wherein if the secondary characteristic is true, the weight associated with the set of instructions is adjusted using the numerical adjustment value.

17. The non-transitory computer-readable medium of claim 16, wherein the set of instructions of the plurality of sets of instructions having the highest modified weight is performed.

18. The non-transitory computer-readable medium of claim 3, wherein the response includes an identifier of a response table, and further wherein the response table includes a plurality of sets of instructions.

19. The non-transitory computer-readable medium of claim 18, wherein, if the second topic is determined to not be the correct topic based on the interaction with the application, the computer-readable instructions further cause the computing device to select a different set of instructions of the plurality of sets of instructions, wherein the selected different set of instructions defines the active topic as a third topic.

20. The non-transitory computer-readable medium of claim 18, wherein, if the second topic is determined to not be the correct topic based on the interaction with the application, the computer-readable instructions further cause the computing device to:
- determine if a different set of instructions of the plurality of sets of instructions can be selected; and
- if a different set of instructions of the plurality of sets of instructions cannot be selected, remove the identified phrase from the first topic.

21. A method of automatically determining a topic of a conversation and responding to the topic determination, the method comprising:
- defining, by a computing device, an active topic as a first topic in response to execution of an application by the computing device, wherein the first topic includes first text defining a plurality of phrases, a probability of occurrence associated with each of the plurality of phrases, and a response associated with each of the plurality of phrases;
- receiving speech text recognized from a recorded audio signal at the computing device, wherein recognition of the speech text is based at least partially on the probability of occurrence associated with each of the plurality of phrases of the first topic;

identifying a phrase of the plurality of phrases associated with the received speech text by the computing device;

performing the response associated with the identified phrase by the computing device, wherein the response includes instructions defining an action triggered by occurrence of the received speech text, and further wherein the action includes defining the active topic as a second topic, wherein the second topic includes second text defining a second plurality of phrases, a second probability of occurrence associated with each of the second plurality of phrases, and a second response associated with each of the second plurality of phrases;

receiving an indicator of an interaction with the application by a user;

in response to receipt of the indicator, determining if the active topic is a correct topic based on the interaction with the application;

if the active topic is determined to be the correct topic based on the interaction with the application, increasing the probability of occurrence associated with the identified phrase; and if the active topic is determined to not be the correct topic based on the interaction with the application, decreasing the probability of occurrence associated with the identified phrase.

\* \* \* \* \*